(12) United States Patent
D'Anna

(10) Patent No.: US 7,118,340 B2
(45) Date of Patent: Oct. 10, 2006

(54) SWASHPLATE AND PITCH LINK ARRANGEMENT FOR A COAXIAL COUNTER ROTATING ROTOR SYSTEM

(75) Inventor: Frank Paul D'Anna, Seymour, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 147 days.

(21) Appl. No.: 10/937,923

(22) Filed: Sep. 10, 2004

(65) Prior Publication Data

US 2006/0056971 A1    Mar. 16, 2006

(51) Int. Cl.
*B64C 27/10*    (2006.01)
(52) U.S. Cl. .................. 416/1; 416/128; 244/17.23; 244/17.25
(58) Field of Classification Search ................ 416/127, 416/128, 129, 1, 115, 130, 150, 124, 147; 244/17.23, 17.25
See application file for complete search history.

(56) References Cited

U.S. PATENT DOCUMENTS

| | | | |
|---|---|---|---|
| 2,427,936 A * | 9/1947 | Wales, Jr. | .................... 416/115 |
| 3,574,483 A | 4/1971 | Linden | |
| 4,008,979 A | 2/1977 | Cooper et al. | |
| 4,047,838 A | 9/1977 | Ferris et al. | |
| 4,170,437 A | 10/1979 | Korsak | |
| 4,227,856 A | 10/1980 | Verrill et al. | |
| 5,281,099 A | 1/1994 | Hunter et al. | |
| 5,340,279 A | 8/1994 | Cycon et al. | |
| 5,364,230 A | 11/1994 | Krauss et al. | |
| 6,672,538 B1 | 1/2004 | Millea et al. | |

* cited by examiner

*Primary Examiner*—Edward K. Look
*Assistant Examiner*—Richard A. Edgar
(74) *Attorney, Agent, or Firm*—Carlson, Gaskey & Olds

(57) ABSTRACT

A coaxial counter-rotating rotor system for a hybrid aircraft includes an upper swashplate assembly and a lower swashplate assembly with a coaxial transmission system therebetween. Movement of the upper and lower swashplate assembly is reflected about a midplane of the coaxial transmission housing to generate sufficient cyclic and/or collective pitch inputs within a compact structural in which the rotor systems are closely spaced along an axis of rotation.

14 Claims, 9 Drawing Sheets

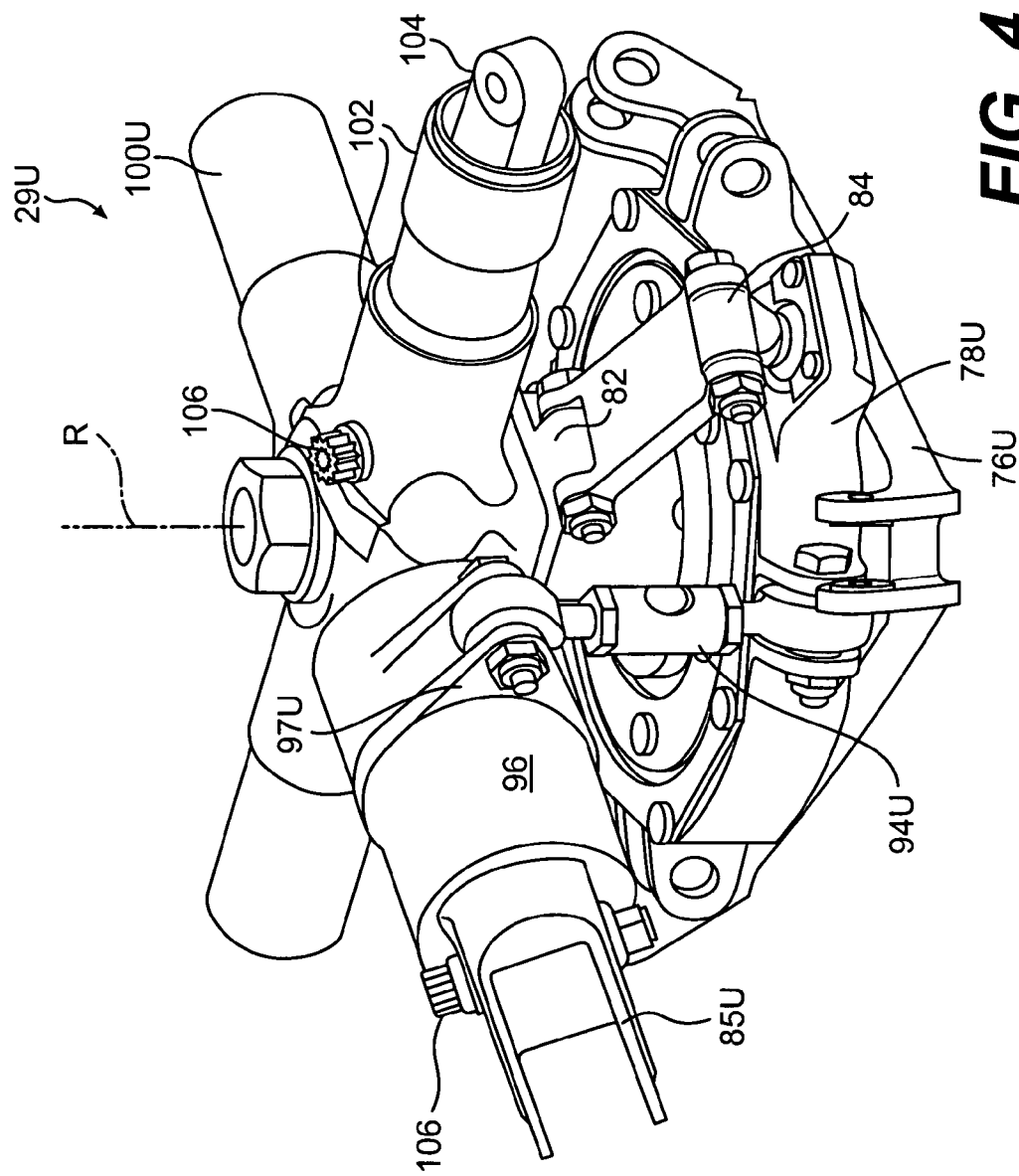

SWASHPLATE AND PITCH LINK ARRANGEMENT FOR A COAXIAL COUNTER ROTATING ROTOR SYSTEM

This invention was made with government support under Contract No: M67854-99-C-2081. The government therefore has certain rights in this invention.

BACKGROUND OF THE INVENTION

The present invention relates to a coaxial counter-rotating rotor system, and more particularly to a pitch control system therefor.

There is an increased emphasis on the use of UAVs for performing various activities in both civilian and military situations where the use of manned flight vehicles may not be appropriate. Such missions include surveillance, reconnaissance, target acquisition, target designation, data acquisition, communications relay, decoy, jamming, harassment, ordinance delivery, or supply.

A hybrid aircraft provides the hover and low-speed maneuverability of a helicopter with the high-speed forward flight and duration capabilities of a winged aircraft. Typically, hybrid aircraft include a helicopter control surface system which provides cyclic pitch, collective pitch and differential rotation to generate lift, pitch, roll, and yaw control when operating in a hover/low-speed environment. Additionally, the hybrid aircraft includes a conventional fixed wing aircraft control surface system such as aileron, elevator, rudder and flaps to provide control when operating in a high-speed environment.

Hybrid aircraft often utilize coaxial counter rotating rotor systems to avoid the necessity of a relatively complex anti-torque rotor system. Coaxial rotor systems are exceeding effective as lift generating mechanisms. Disadvantageously, conventional dual counter rotating coaxial rotor systems require a relatively large separation between each rotor system. Such a separation is required to provide adequate cyclic and collective pitch control though swashplate articulation and differential rotor blade flapping to assure clearance therebetween regardless of aircraft maneuver. Disadvantageously, application of such rotor spacing to a hybrid UAV type aircraft may result in a relatively tall aircraft with associated storage and transportation limitations.

Accordingly, it is desirable to provide a coaxial counter-rotating rotor system for a hybrid aircraft which generates sufficient cyclic and/or collective pitch inputs within a compact, closely spaced structure.

SUMMARY OF THE INVENTION

A coaxial counter-rotating rotor system for a hybrid aircraft according to the present invention includes an upper and a lower swashplate assembly with a coaxial transmission system therebetween. Pitch inputs are coupled to the coaxial counter-rotating rotor systems by a multiple of pitch control rods which extend from the rotating swashplates to engage an upper pitch link mount extending from a leading edge on each of a multiple of pitch sleeves on the upper rotor system. A multiple of pitch control rods extend from the rotating lower swashplate to a lower pitch link mount extending from a trailing edge on each of a multiple of pitch sleeves on the lower rotor system.

The upper and lower swashplate assemblies move away from the coaxial transmission housing to achieve high collective pitch due to connecting the upper pitch control rods to the leading edge and the connecting of the lower pitch control rods to the trailing edge. Movement of the upper and lower swashplate assembly is reflected about the midplane of the coaxial transmission housing. Since the aircraft is of a hybrid aircraft type, minimal cyclic pitch is required at low collective pitch positions as the aircraft is generally operating in an airplane flight mode at the low collective pitch positions.

The present invention therefore provides a coaxial counter-rotating rotor system for a hybrid aircraft which generates sufficient cyclic and/or collective pitch inputs within a compact, closely spaced structure.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4 is a perspective view of a coaxial counter-rotating rotor system;

DETAILED DESCRIPTION OF THE PREFERRED EMBODIMENT

Figure 1A:
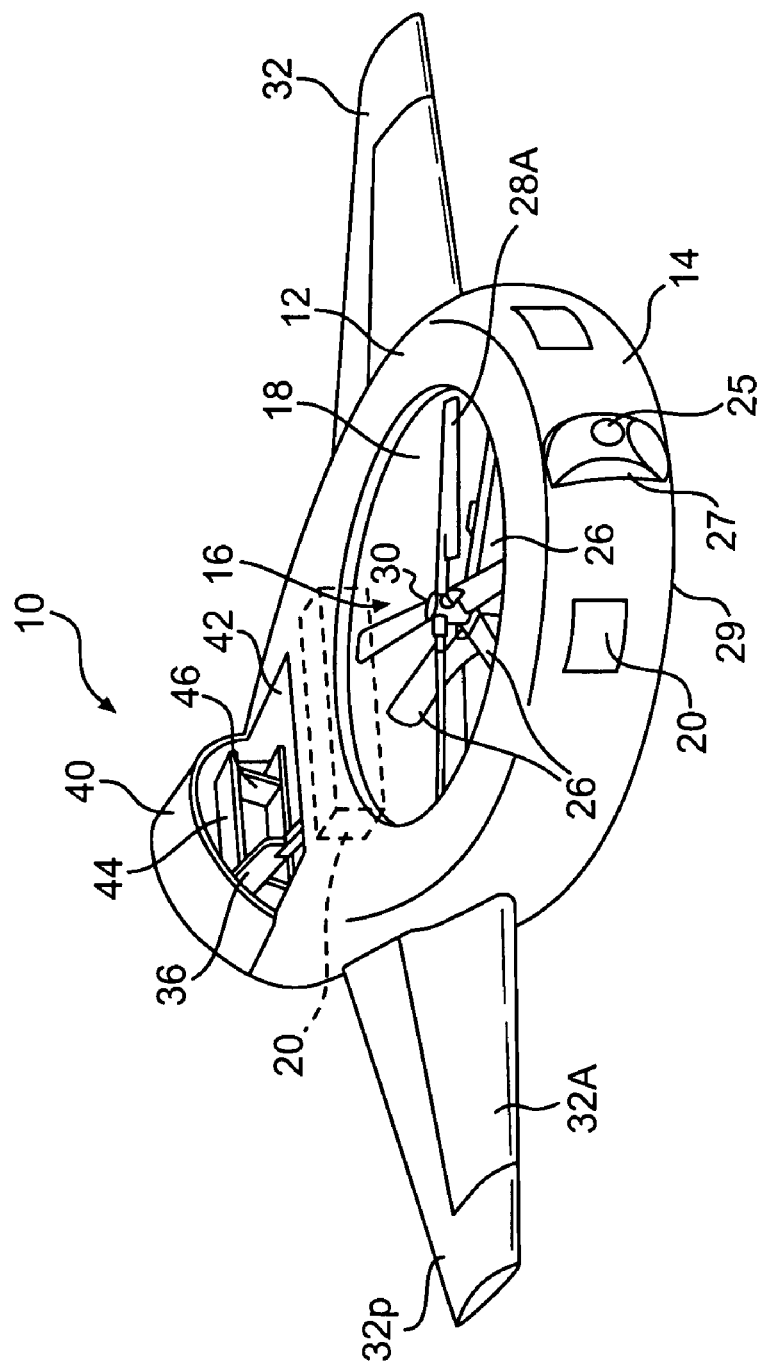
FIG. 1A is a general perspective view of a hybrid aircraft having a transmission system according to the present invention.
Figure 1B:
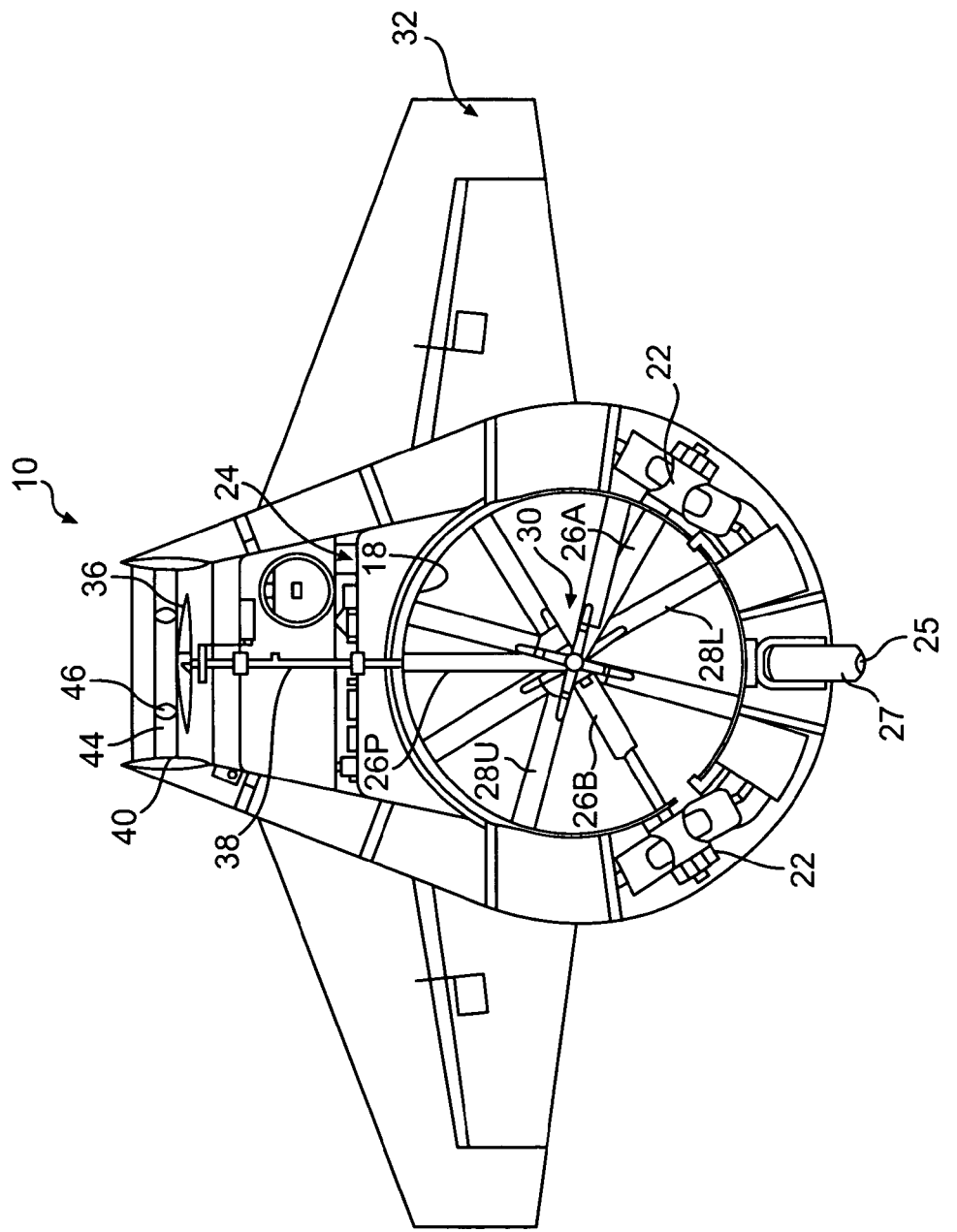
FIG. 1B is a top view of the hybrid aircraft of FIG. 1A.

FIGS. 1A and 1B illustrate a general perspective view of a hybrid aircraft 10, such as the Unmanned Aerial Vehicle (UAV) developed by Sikorsky Aircraft Corporation. It should be understood that other coaxial counter rotating rotor system aircraft, particularly hybrid aircraft, will also benefit from the instant invention.

The aircraft 10 includes a body 12 with a toroidal portion 14 having a generally hemi-cylindrical aerodynamic profile. A rotor system 16 is mounted within a duct 18 that extends substantially vertically through the body 12.

The body 12 includes a plurality of internal bays 20 for housing and/or storing aircraft flight and mission components. The bays 20 house one or more powerplant subsystems 22 and a flight control system 24 positioned within the bays to balance the aircraft about the center of the rotor assembly. The flight control system 24 generally includes flight computers, transmitters, receivers, navigation sensors and attitude sensors well known in the UAV field.

Mission related sensors 25, such as a camera system, forward looking infrared radar (FLIR) sensor, laser designator, thermal imager, communications, or the like are also preferably located in a turnable turret 27 in a forward area of the aircraft 10. It should be understood that although a particular component arrangement is disclosed in the illustrated embodiment, other arrangements, replaceable mission packages, weapon systems and the like will benefit from the instant invention.

A plurality of struts 26A, 26B, 26P extend between the body and the rotor assembly 16 to support the rotor assembly 16 in a fixed co-axial relation with respect to the duct 18. The support struts 26A, 26B, 26P also provide structural rigidity to the aircraft duct 18 to prevent flight and ground loads from distorting the body 12. The support struts 26 are hollow structures that can be used as conduits for interconnecting operating elements of the aircraft 10.

Figure 2A:
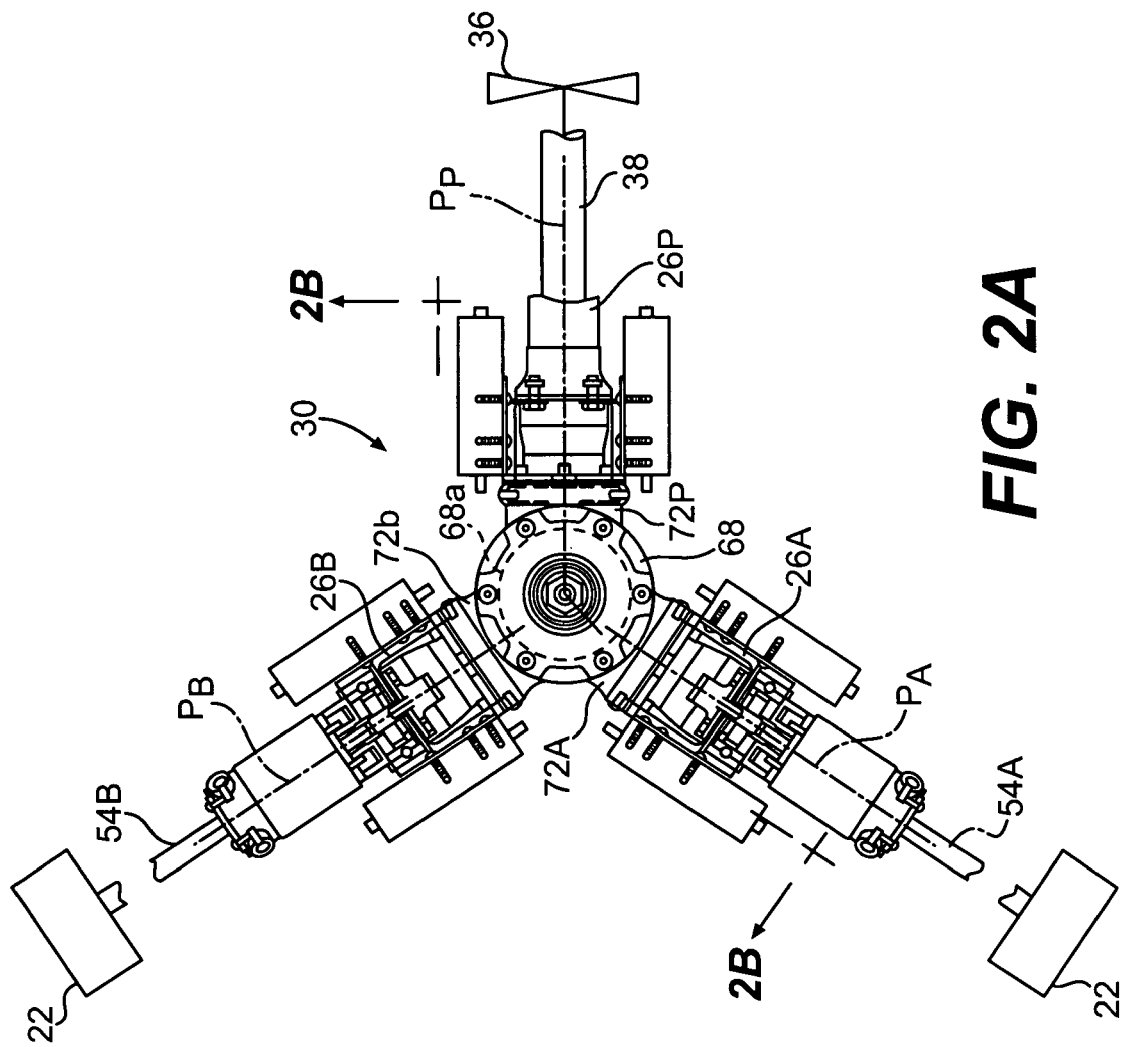
FIG. 2A is a top view of a transmission for a hybrid aircraft designed according to the present invention.
Figure 2B:
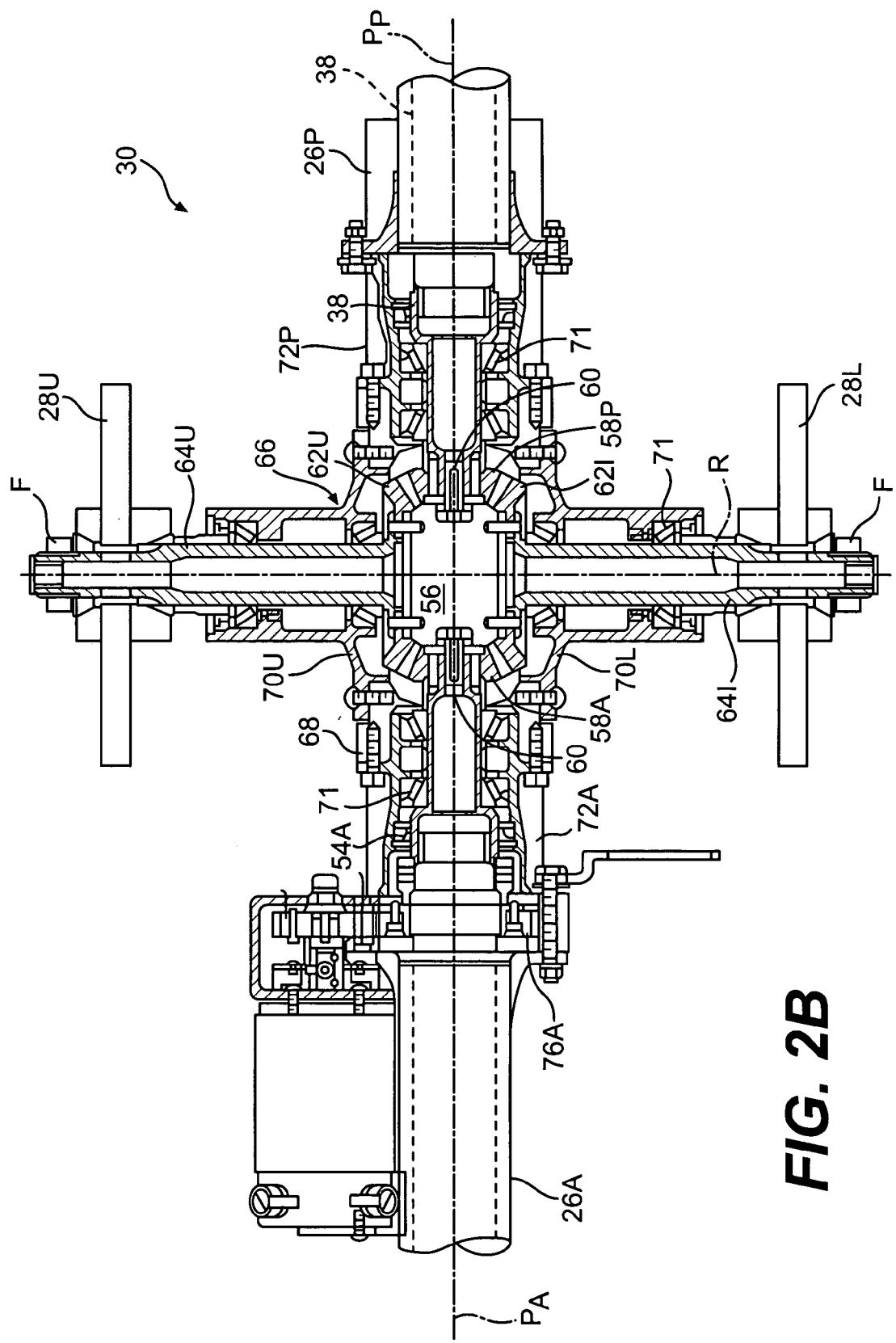
FIG. 2B is an expanded side view of the transmission of FIG. 2A taken along the line 2B—2B.
Figure 3:
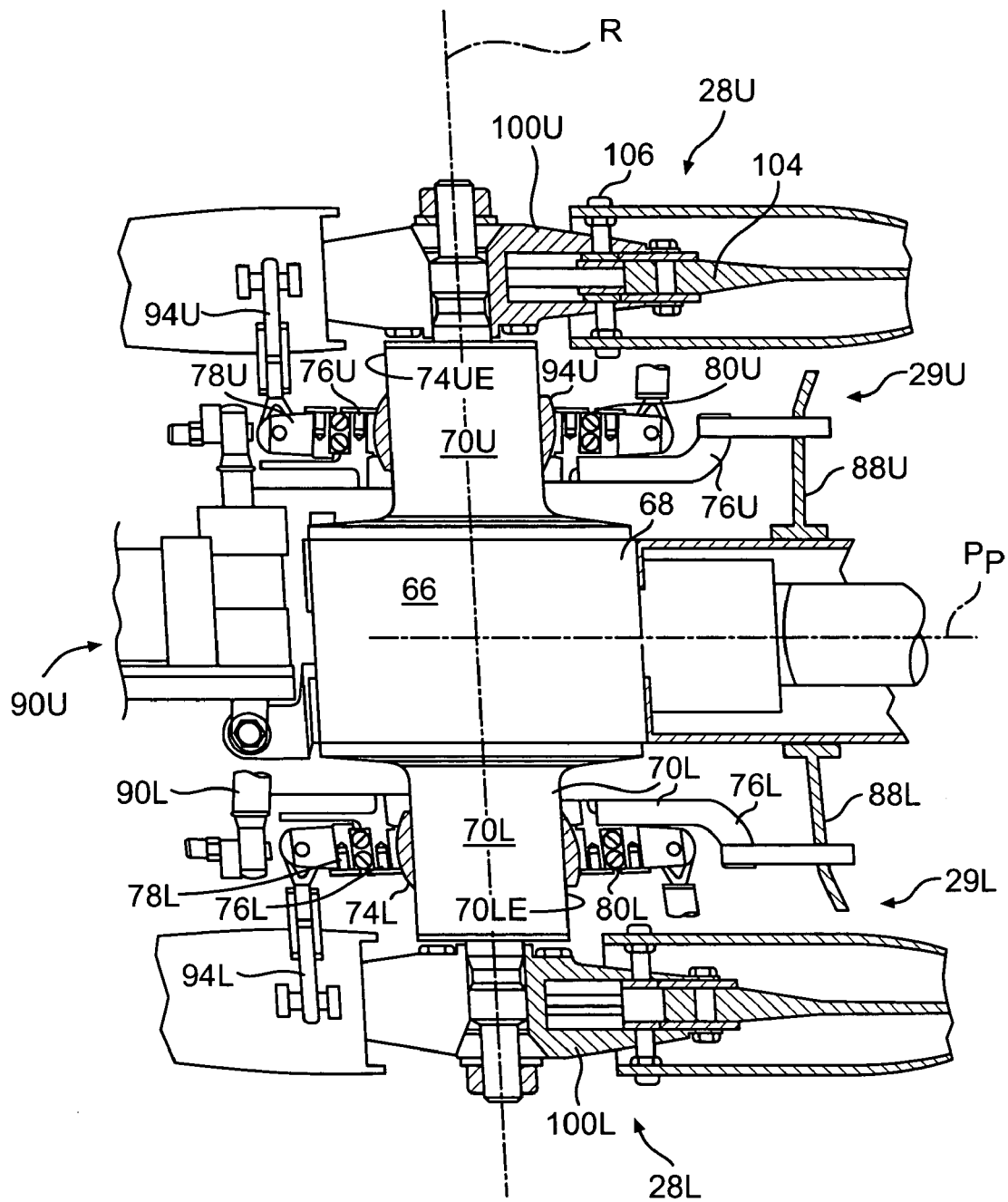
FIG. 3 is a side view of a coaxial counter-rotating rotor system.

The rotor system 16 includes a pair of multi-bladed, counter-rotating rotor systems 28U, 28L, coaxially aligned within the duct 18, and a coaxial transmission system therebetween (30, FIGS. 2A, 2B). Each counter-rotating rotor system 28U, 28L preferably includes a plurality of blade assemblies in which blade pitch changes induced in the counter-rotating rotor systems 28U, 28L, i.e., cyclic and/or collective pitch inputs, can be utilized to generate lift, pitch, yaw, and roll control of the aircraft 10. Control is preferably provided by cyclic and collective movement of the multi-bladed, counter-rotating rotor systems 28U, 28L through upper and lower swashplates 29U, 29L (FIG. 3).

Wings 32 extend laterally outward from the aircraft body 12 to provide high lifting forces and a large nose-down pitching moment in forward translational flight. Those skilled in the art would readily appreciate the diverse wing and non-wing arrangements that can be incorporated into a UAV according to the present invention. Preferably, each wing 32 includes a fixed stub portion 32F and a pivotal flight control surface portion 32P such as a flaperon or aileron.

To provide translational thrust, the aircraft 10 includes a pusher prop 36 mounted to a rear portion of the aircraft 10. The prop 36 is mounted to a drive shaft 38 which is driven by the transmission system 30. The drive shaft 38 preferably extends with a support strut 26P. The prop 36 is preferably mounted to the rear of the aircraft with its rotational axis oriented substantially horizontal.

A prop shroud 40 is formed on the aft body 42 and around the pusher prop 36. The cross-sectional shape of the shroud 40 is preferably configured as an airfoil to provide the shroud 40 with a lift component. Mounted on the shroud 40 aft of the pusher prop 36 are one or more horizontal and vertical control surfaces 44, 46. Preferably, the control surfaces 44, 46 are pivotally mounted to the shroud 40 to permit the exhausted air to be channeled in a controllable manner such that the horizontal control surfaces 44 function as elevators and the vertical control surfaces 46 function as rudders.

Referring to FIG. 2A, a top view of the coaxial transmission system 30 is illustrated. The drive shaft 38 is mounted along an axis of rotation Pp to drive the pusher prop 36 through one of the support struts 26p. The driveshafts 54A, 54B extend through a respective support strut 26A, 26B to transfer power developed by the powerplant 22 (FIG. 1B) to the coaxial transmission 30.

Referring to FIG. 2B, a sectional view of the transmission system 30 is illustrated showing the transmission gear set 56. Each driveshafts 54A, 54B, and 38 are mounted to a pinion gear 58A, 58B, and 58P through a threaded fastener 60 or the like. The pinion gears 58A, 58B, and 58P are mounted between and mesh with an upper and lower counter-rotating gear 62U, 62L. The upper and lower counter-rotating gear 62U, 62L are preferably located in a plane parallel to the counter-rotating rotor systems 28U, 28L. The upper and lower counter-rotating gear 62U, 62L drive a respective upper and lower rotor shaft 64U, 64L which rotates the counter-rotating rotor systems 28U, 28L about an axis R. Self-locking fasteners F are threaded onto the ends of the respective rotor shafts 64U, 64L to secure the rotor hubs in interlocked, engaged combination.

Input power is transmitted from the powerplants 22 through the driveshafts 54A, 54B to the upper and lower counter-rotating gear 62U, 62L and the drive shaft 38. The transmission system 30 includes a coaxial transmission housing 66 manufactured of a multiple of portions: a center hub 68; an upper standpipe housing 70U; a lower standpipe housing 70L, and three pinion housings 72A, 72B, and 72P. The outer surface of the upper and lower standpipe housings 70U, 70L are preferably hard chrome plated to provide a smooth and durable surface for operation of the upper and lower swashplates 29U, 29L (FIG. 3).

Referring to FIG. 3, the coaxial transmission housing 66 utilizes the external surfaces 70UE, 70LE of the upper and lower standpipe housings 70UL, 70 as sliding surfaces for the bidirectional translational movement of the respective upper and lower swashplates 29U, 29L. The range of such bidirectional linear motion is sufficient to couple the requisite collective pitch inputs to respective blades of the counter-rotating rotor systems 28U, 28L for flight operations of the aircraft 10.

Each swashplate assembly 29U, 29L includes a central spherical ball bearing 74U, 70L, a stationary swashplate 76U, 76L, a rotating swashplate 78U, 78L, an annular bearing 80U, 80L intermediate the stationary and rotating swashplates 76U, 78U; 76L, 78L to facilitate rotary motion therebetween, a rotating scissor hub plate 82U, 82L, a rotating scissor assembly 84U, 84 mechanically interconnecting the rotating swashplate 78U, 78L and the rotating scissor hub plate 82U, 82L (upper swashplate assembly 29U alone also illustrated in FIG. 4), and a stationary scissor assembly 86U, 86L mechanically interconnecting the stationary swashplate 76U, 76L to a respective stationary scissor supports 88U, 88L secured to the coaxial transmission housing 66. It should be understood that other swashplate assemblies may also be used with the present invention.

The stationary swashplate 78U, 78L is mounted in combination with the central spherical ball 74U, 74L for pivotal movement with respect thereto to provide cyclic pitch inputs to the multi-bladed, counter-rotating rotor systems 28U, 28L. Such pivotal motion is induced in the stationary swashplate 78U, 78L by actuators 90U, 90L (illustrated schematically) as generally understood. Collective pitch inputs to the multi-bladed, counter-rotating rotor 28U are effectuated by bidirectional linear motion of the stationary swashplate 78U, 78L and central spherical ball 74U, 74L along axis R in response to control inputs from the actuators 90U, 90L.

Figure 5A:
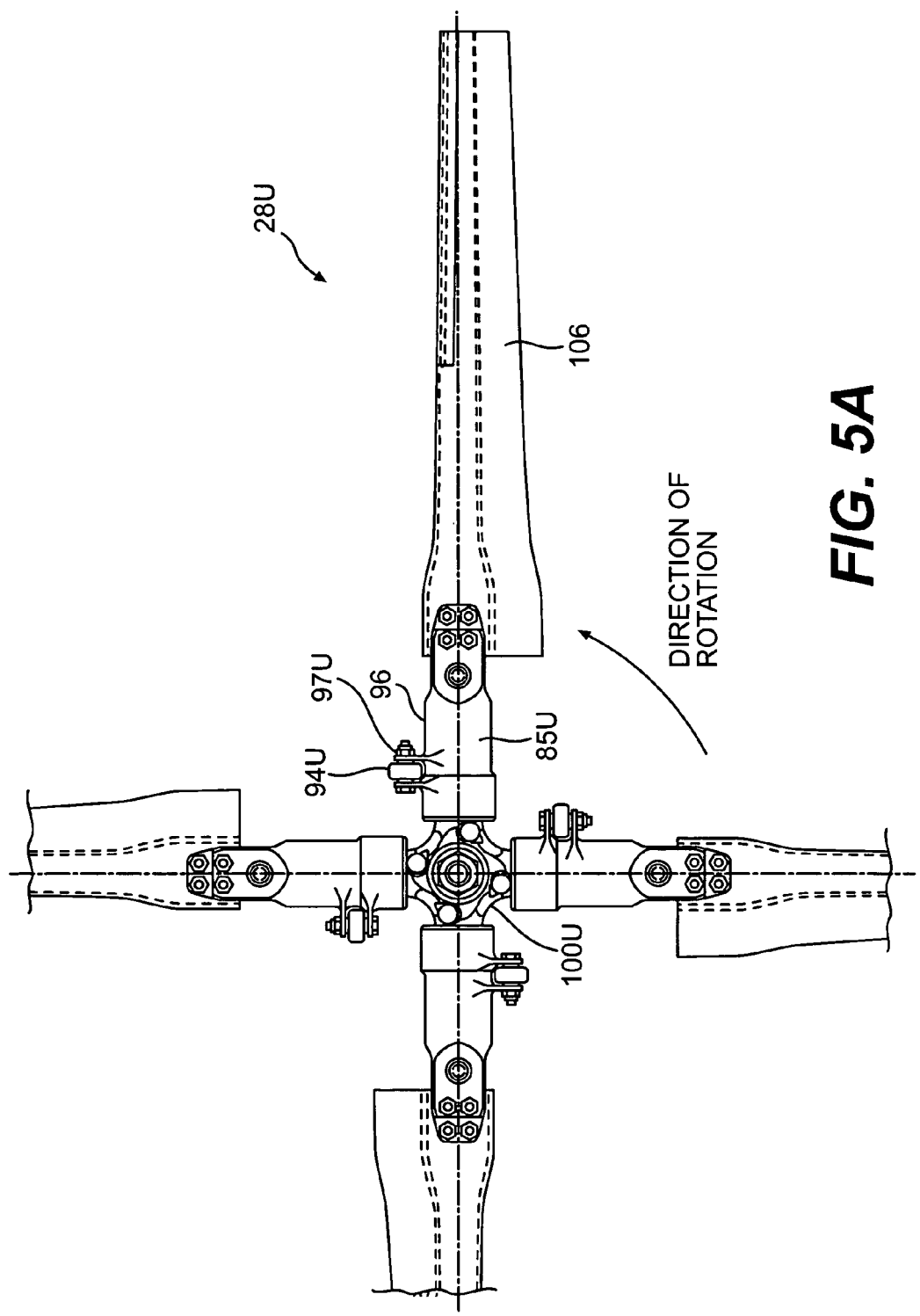
FIG. 5A is a top view of an upper rotor system of a coaxial counter-rotating rotor system.
Figure 5B:
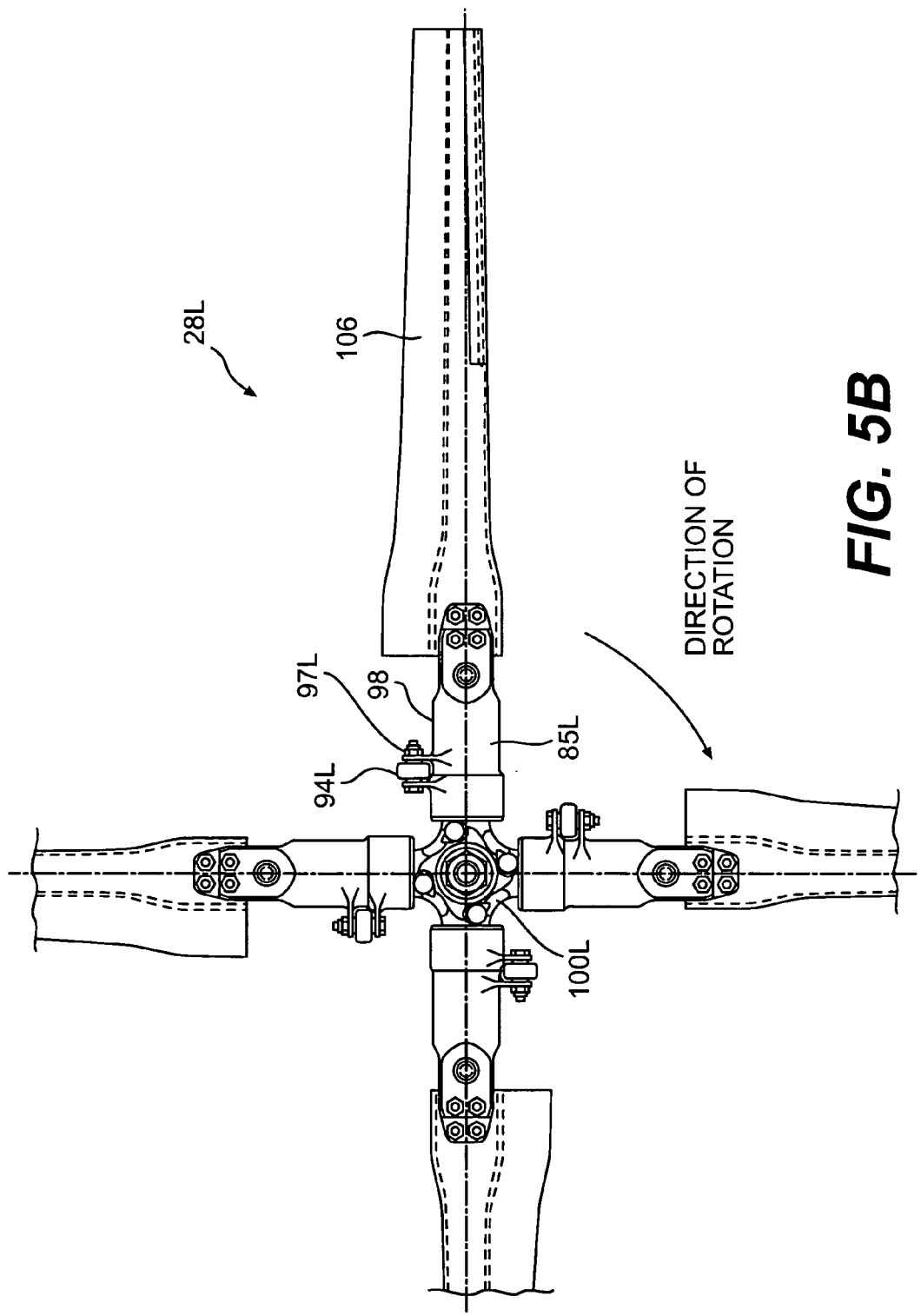
FIG. 5B is a top view of a lower rotor system of a coaxial counter-rotating rotor system.

Collective and cyclic pitch inputs are coupled from the stationary swashplate 76U, 76L to the rotating swashplate 78U, 78L. The pitch inputs are coupled to the multi-bladed, counter-rotating rotor systems 28U, 28L by a multiple of pitch control rods 94U which extend from the upper rotating swashplate 78U and selectively engage with an upper pitch link mount 97U extending from a leading edge 96 (FIG. 5A) of a pitch sleeve 85U on the upper rotor system 28U and a multiple of pitch control rods 94L which extend from the rotating swashplate 78L to a lower pitch link mount 97L extending from a trailing edge 98 (FIG. 5B) on each of a multiple of pitch sleeves 85L on the lower rotor system 28L. Ball links or other articulatable connectors are preferably located between the pitch control rods 94U, 94L and the respective pitch link mounts 97U, 97L. It should be understood that various swashplate actuators, which drive the swashplates collectively and cyclically, will benefit from the present invention.

Each pitch sleeve 85U, 85L is rotationally supported on an upper and lower hub 100U, 100L by a multiple of bearings 102 (best viewed in FIG. 4). A tension/torsion strap 104 is mounted within each hub 100U, 100L through fasteners 106 to retain a respective blade assembly 106 (FIGS. 5A, 5B) on each hub 100U, 100L of each multi-bladed, counter-rotating rotor systems 28U, 28L thereto.

Figure 6:
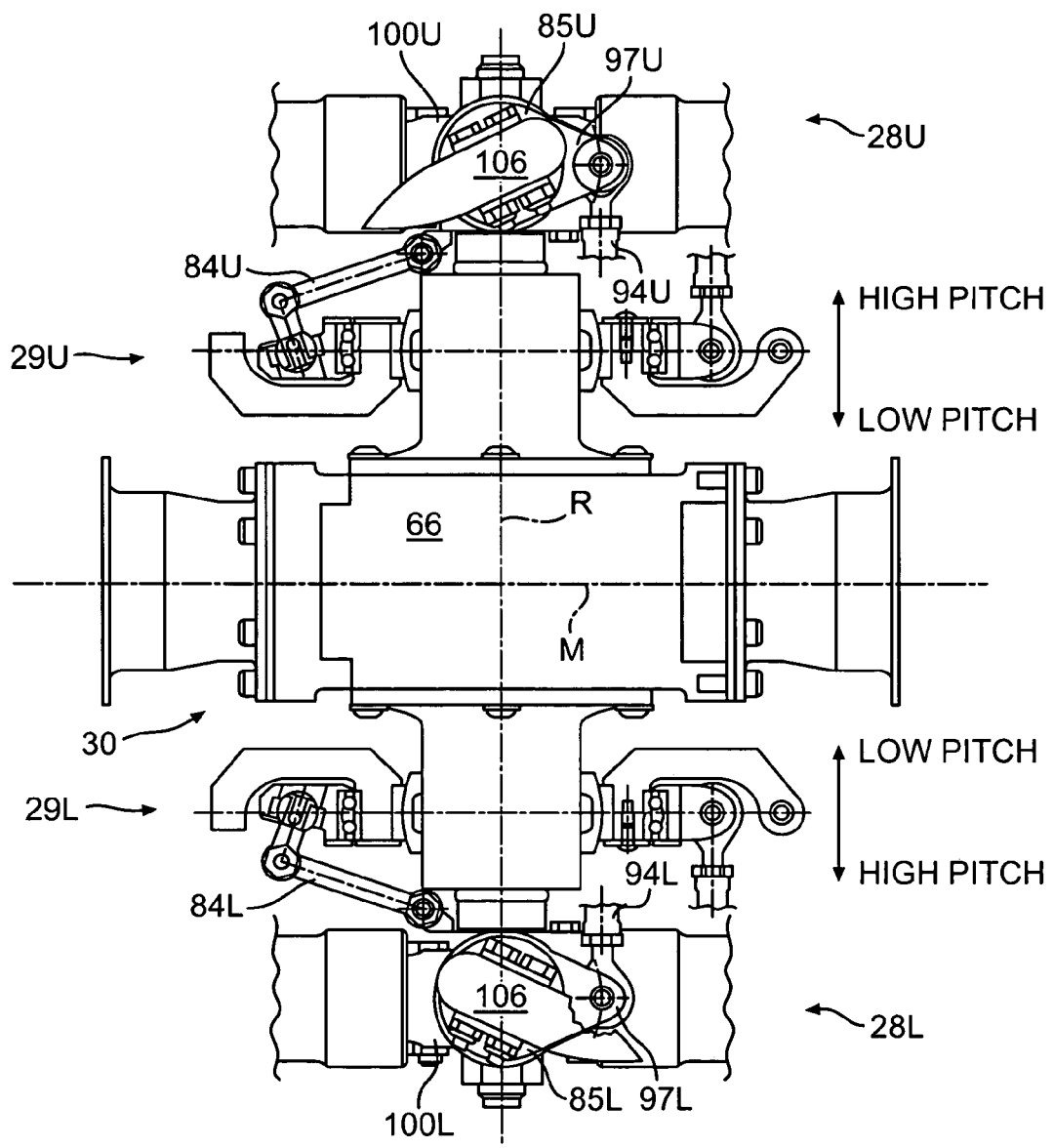
FIG. 6 is a side view of a coaxial counter-rotating rotor system illustrating swashplate movement according to the present invention.

Referring to FIG. 6, both swashplate assemblies 29U, 29L move away from the coaxial transmission housing 66 to achieve high collective pitch due to connecting the upper pitch control rods 94U to the leading edge of 96 of each upper pitch sleeve 85U and connecting the lower pitch control rod 94L to the trailing edge 98 of each lower pitch sleeve 85L. That is, movement of the upper and lower swashplate assembly 29U, 29L is reflected about the midplane M of the coaxial transmission housing 66. Since the aircraft 10 is preferably of a hybrid aircraft type, minimal cyclic pitch is required at low collective pitch positions as the aircraft 10 is generally operating in an airplane flight mode. Sufficient cyclic and/or collective pitch inputs are provided to generate lift, pitch, yaw, and roll control of the aircraft 10 within a compact structural and aerodynamic envelope in which the rotor systems 28U, 28L are closely spaced along the axis of rotation R.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

For further understanding of other aspects of the airflow distribution networks and associated components thereof, attention is directed to U.S. Pat. No. 5,327,744 which is assigned to the assignee of the instant invention and which is hereby incorporated herein in its entirety.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A coaxial counter-rotating rotor system comprising:
an upper rotor system;
a lower rotor system;
a coaxial transmission system located between and operable to counter-rotate said upper rotor system and said lower rotor system about an axis, said coaxial transmission system defining a midplane transverse to said axis; and
an upper swashplate assembly and a lower swashplate assembly which move away from said midplane to generate a high collective pitch in said upper rotor system and said lower rotor system.

2. The coaxial counter-rotating rotor system as recited in claim 1, further comprising an upper pitch control rod connected between said upper swashplate and a leading edge of a rotor blade of said upper rotor system.

3. The coaxial counter-rotating rotor system as recited in claim 2, further comprising an upper pitch sleeve mounted to said rotor blade, said upper pitch control rod connected to said upper pitch sleeve.

4. The coaxial counter-rotating rotor system as recited in claim 3, further comprising an upper rotating swashplate of said upper swashplate assembly, said upper pitch control rod connected to said upper rotating swashplate.

5. The coaxial counter-rotating rotor system as recited in claim 1, further comprising a lower pitch control rod connected between said lower swashplate and a trailing edge of a rotor blade of said lower rotor system.

6. The coaxial counter-rotating rotor system as recited in claim 5, further comprising a lower pitch sleeve mounted to said rotor blade, said lower pitch control rod connected to said lower pitch sleeve.

7. The coaxial counter-rotating rotor system as recited in claim 6, further comprising a lower rotating swashplate of said lower swashplate assembly, said lower pitch control rod connected to said lower rotating swashplate.

8. The hybrid aircraft as recited in claim 1, further comprising an upper pitch control rod connected between said upper swashplate and a leading edge of an upper rotor blade of said upper lower system and a lower pitch control rod connected between said lower swashplate and a trailing edge of a lower rotor blade of said lower rotor system.

9. The hybrid aircraft as recited in claim 8, further comprising an upper pitch sleeve mounted to said upper rotor blade, said upper pitch control rod connected to said upper pitch sleeve and a lower pitch sleeve mounted to said lower rotor blade, said lower pitch control rod connected to said lower pitch sleeve.

10. A hybrid aircraft comprising:
a body comprising a toroidal portion and a rotor duct;
an upper rotor system mounted within said rotor duct;
a lower rotor system mounted within said rotor duct;
a coaxial transmission system located between and operable to counter-rotate said upper rotor system and said lower rotor system about an axis, said coaxial transmission system defining a midplane transverse to said axis; and
an upper swashplate assembly and a lower swashplate assembly which move away from said midplane to generate a high collective pitch in said upper rotor system and said lower rotor system.

11. The hybrid aircraft as recited in claim 10, wherein movement of said upper swashplate assembly and said lower swashplate assembly is reflected about said midplane.

12. The hybrid aircraft as recited in claim 10, wherein said coaxial transmission system includes an upper and lower standpipe housing which extend along an axis of rotation, said upper swashplate assembly and said lower swashplate assembly slidable along an external surface of said respective upper and lower standpipe housing.

13. A method of controlling a rotor system of a hybrid aircraft comprising the steps of:
(1) counter-rotating an upper rotor system and a lower rotor system about an axis with a coaxial transmission system located therebetween; and (2) reflecting movement of an upper swashplate assembly and a lower swashplate assembly about a midplane transverse to said axis of the coaxial transmission system wherein the upper swashplate assembly and the lower swashplate assembly move away from the midplane to generate a high collective pitch in the upper rotor system and the lower rotor system.

14. A method as recited in claim 13, wherein said step (2) further comprises:
   providing a pitch input to a leading edge of the upper rotor system; and
   providing a pitch input to a trailing edge of the lower rotor system.

\* \* \* \* \*